March 31, 1959 G. B. LONG 2,879,763
DOMESTIC APPLIANCE
Filed Jan. 3, 1955 4 Sheets-Sheet 1

INVENTOR
George B. Long
BY R R Candor
His Attorney

March 31, 1959     G. B. LONG     2,879,763
DOMESTIC APPLIANCE

Filed Jan. 3, 1955     4 Sheets-Sheet 2

INVENTOR
BY George B. Long
R R Candor
His Attorney

March 31, 1959 G. B. LONG 2,879,763
DOMESTIC APPLIANCE
Filed Jan. 3, 1955 4 Sheets-Sheet 3

INVENTOR
BY George B. Long
R R Candor
His Attorney

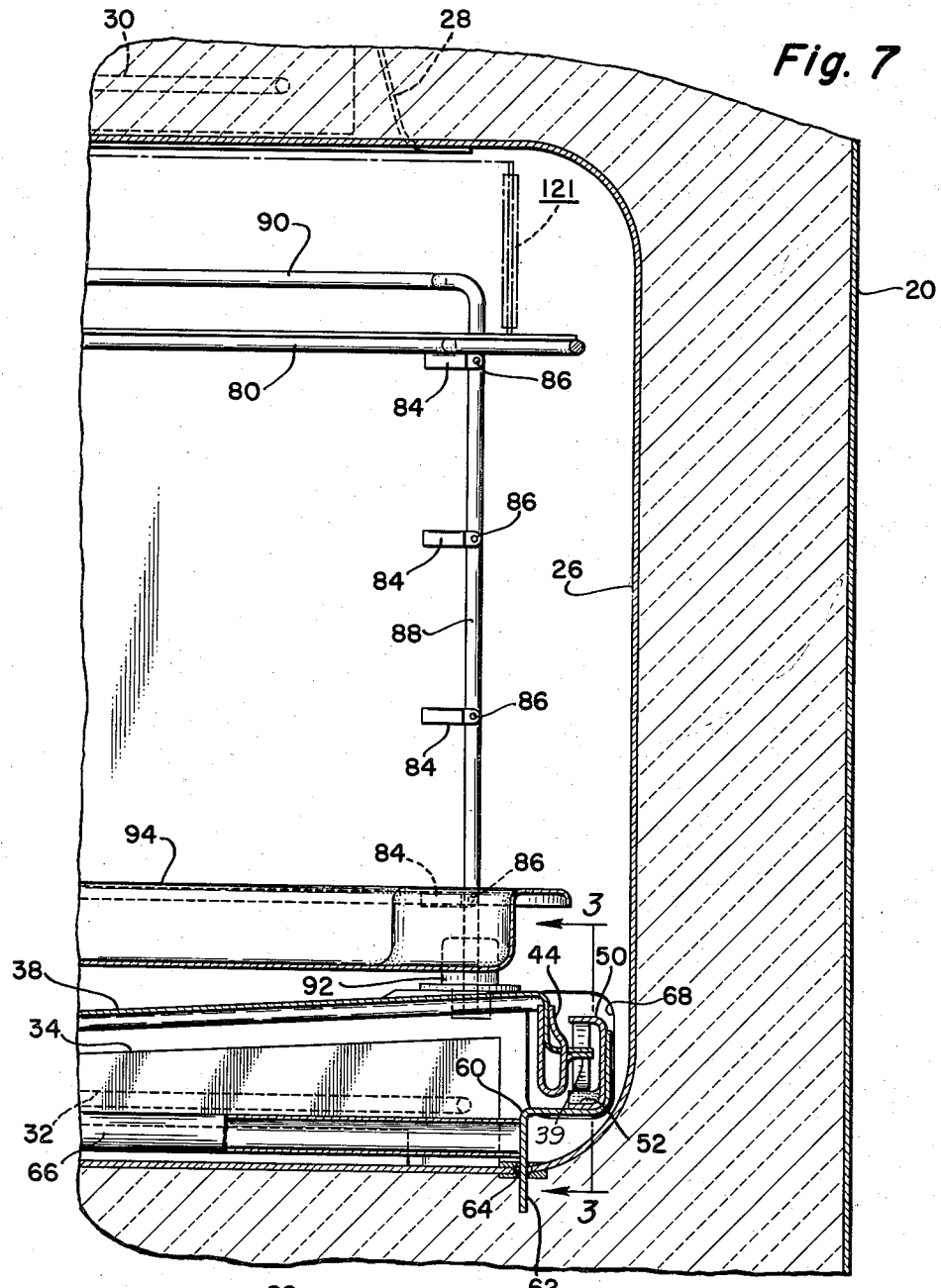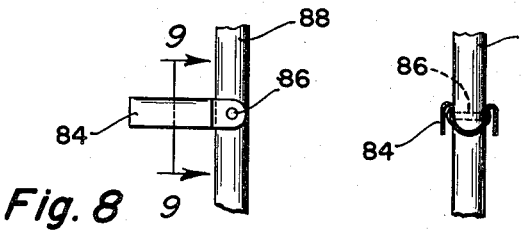

United States Patent Office 2,879,763
Patented Mar. 31, 1959

2,879,763

DOMESTIC APPLIANCE

George B. Long, Dayton, Ohio, assignor to General Motors Corporation, Detroit, Mich., a corporation of Delaware Application January 3, 1955, Serial No. 479,508

1 Claim. (Cl. 126—340)

This invention relates to a domestic appliance and more particularly to domestic ovens.

In the ordinary domestic oven, the door folds down outwardly from the oven thereby making it necessary to stand away from the oven when it is desired to place things into or remove things from the oven. The things baking in the oven are also relatively far away for inspection. The exposed hot inner panel of the door is a potential danger since it will cause burns if touched.

It is an object of this invention to provide an arrangement which is easy and convenient to use and clean.

It is another object of this invention to provide an oven arrangement wherein the shelves can easily be loaded and unloaded and the cooking operations inspected outside of the oven.

It is another object of this invention to provide a broiling arrangement in which the grease is collected and kept relatively cool.

These and other objects are obtained in the form shown by providing a door and shelf arrangement which pull out from the oven in a manner similar to a drawer. The shelves are movably mounted upon the door support and can be located at suitable convenient heights. The door and support are provided with a roller supporting arrangement operating in tracks provided by a framework which is removably mounted within the bottom of the oven. The liner of the oven is smooth and free from configuration so that it can be readily cleaned. A collapsible shield is provided for broiling to prevent hot grease from being spattered onto the oven walls.

Further objects and advantages of the present invention will be apparent from the following description, reference being had to the accompanying drawings, wherein a preferred form of the present invention is clearly shown.

In the drawings:

Figure 1 is a horizontal sectional view taken along the lines 1—1 of Figure 2;

Figure 2 is a vertical sectional view taken along the lines 2—2 of Figure 1 with the heater 32 and the baffle 34 being omitted;

Figure 7 is an enlarged vertical sectional view taken substantially along the lines 7—7 of Figure 2;

Figure 8 is a fragmentary enlarged view of one of the pivoted shelf supports;

Figure 9 is a fragmentary sectional view taken along the lines 9—9 of Figure 8.

Figure 2:
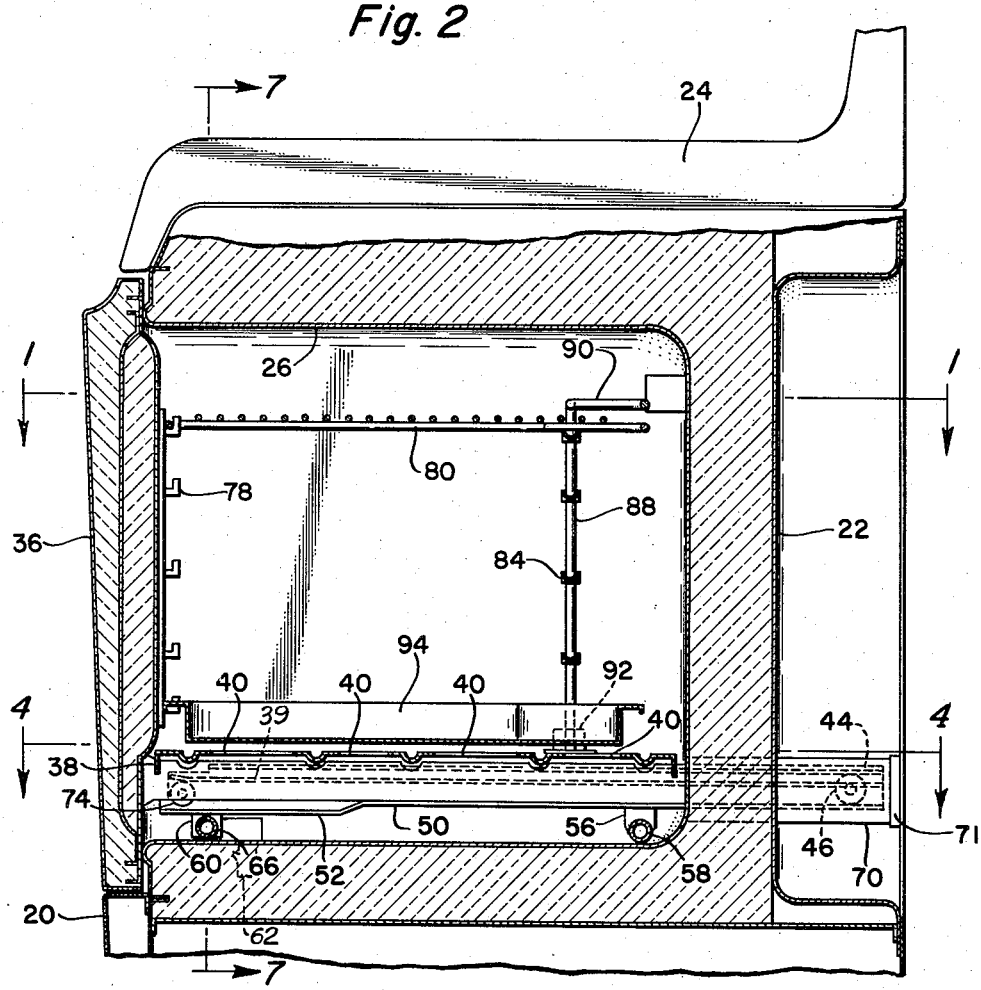

Referring now to the drawings and more particularly to Figures 2 and 7 there is shown a domestic electric range including an outer shell 20 provided with a recessed rear wall portion 22 and a removable top wall portion 24. Within the outer shell is a box shaped sheet metal inner liner 26 having a front opening provided with and surrounded by an outwardly turned flange connecting with the outer shell. The top wall of the inner liner 26 is provided with a raised portion 28 containing a broil type heating unit 30. The bottom of the oven liner 26 is provided with a baking heater 32 which is covered by a baffle 34 to control the flow of air circulation within the liner 26 to keep the temperatures substantially uniform throughout the oven.

Figure 4:
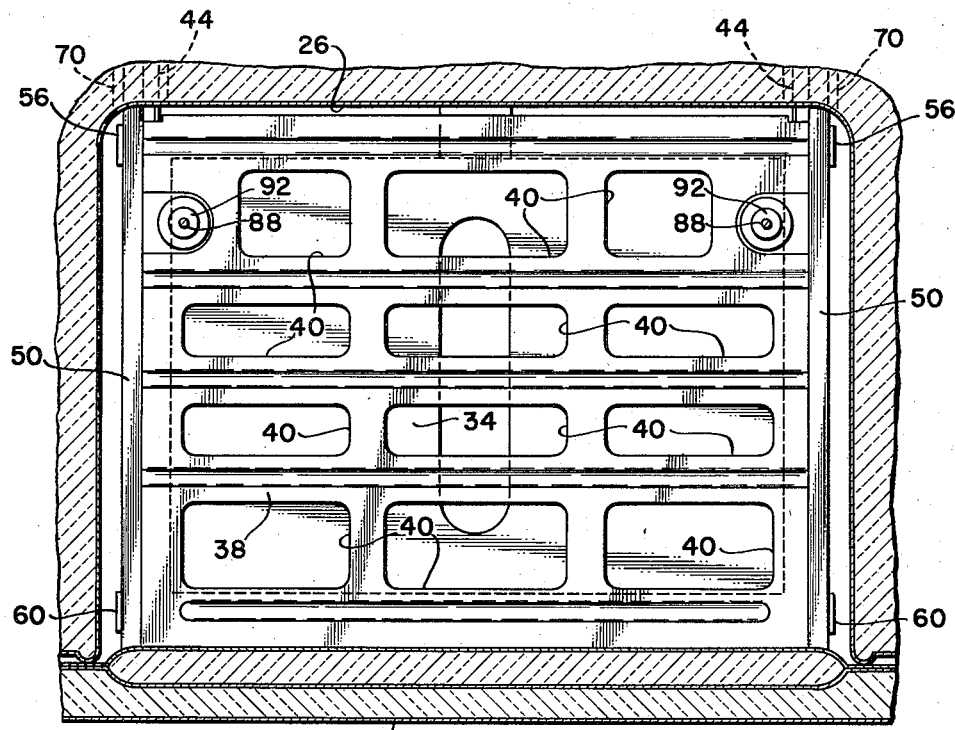
Figure 4 is a horizontal sectional view taken along the lines 4—4 of Figure 2.

The front of the oven is closed by an ornamental vertical door 36. Fastened to the rear face of this door 36 is a horizontal perforated support 38. This perforated support 38 is provided with a plurality of apertures 40 through which air within the liner 26 may circulate in flowing to and from the heater 32. The baffle 34 with its centrally elongated aperture is clearly visible through the apertures in the support 38 as seen in Figure 4. Upon each side, the support 38 is provided with a rearwardly extending projection 44. The rear end of each of these projections is provided with a metal roller 46 upon a ball bearing mounting.

Figure 3:
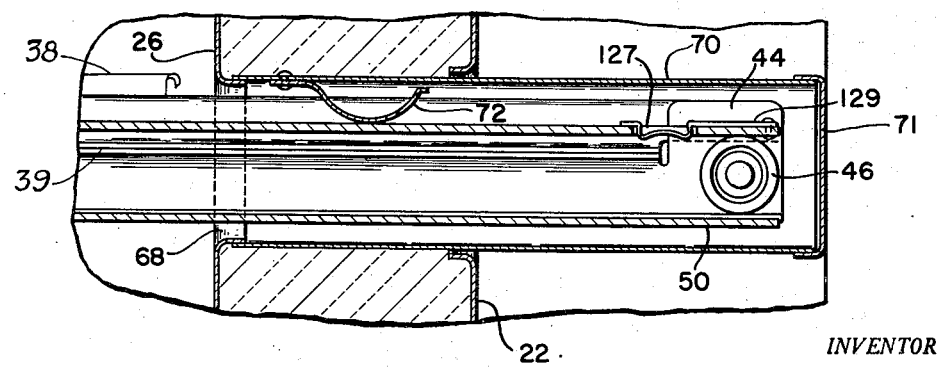
Figure 3 is a fragmentary enlarged view of the rear portion of one of the guide rails taken along the lines 3—3 of Figures 1 and 7.
Figure 5:
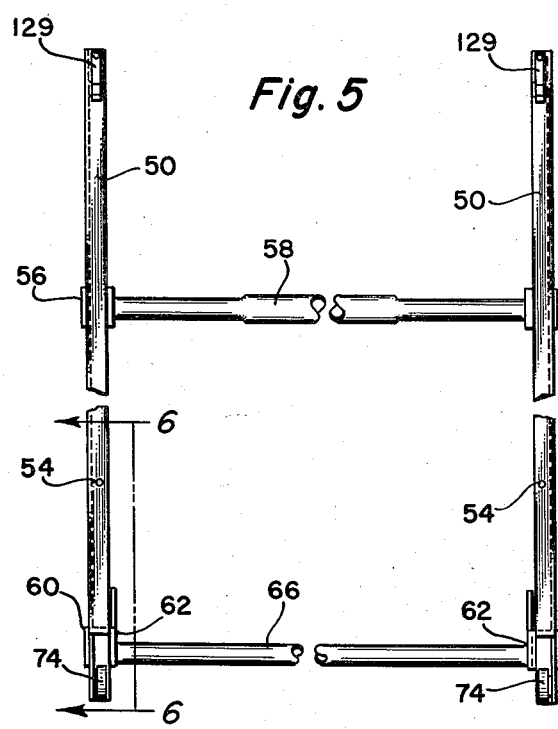
Figure 5 is a plan view of the roller track frame construction.
Figure 6:
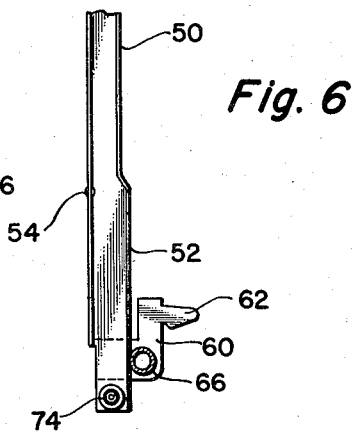
Figure 6 is a fragmentary sectional view taken along the lines 6—6 of Figure 5.

For guidance, these rollers 46 roll within the side rails 50 of the configuration shown in Figures 5 to 7 having an offset enlarged front portion 52 in front of and beneath the rivets 54 in each top rail. At the rear, each of the rails 50 are provided with a downward extending supporting ear 56 resting on the bottom of the liner 26 and joined by a cross tube 58. At the front, the rails 50 are each provided with a Z-shaped downwardly extending projection 60 having a portion supported by the bottom of the liner 26 and having a notched tongue 62 fitting within a slot 64 provided in the front bottom portion of the liner 26 as shown in Figure 7. The notched tongues 62 are also connected by a tubular cross member 66. The side rails 50 and the cross members 58 and 66 form a removable frame in which the tongues 62 are held within the notches 64 to hold the frame in place. The projections 56 and 60 rest upon the bottom wall of the oven liner 26. The rails 50 each extend through an aperture 68 in the rear wall of the liner 26 to the rear of the oven shell as shown in Figures 2 and 3.

This rearwardly extending portion of the rails 50 is enclosed within tubular casing 70 provided with a cap 71 closing the outer end thereof. To hold the framework firmly in place within the oven liner 26, the inside of each tubular casing 70 is provided with a flat spring 72 which bears upon the top of one of the rails 50 as shown in Figure 3. These springs 72 assist in holding the rear end of the rails down with the projection 58 firmly in contact with the bottom of the liner. The front of the guide rails 50 are each provided with a roller 74 which supports the flange 39 extending laterally from the outer sides of the support 38 to support the front end of the door 36 and the support 38. The rails 50 guide the rear rollers 46 throughout the outward movement of the door 36 until the rollers 46 engage the rivets 54. The rivets 54 prevent actual outward movement of the door when the door is pulled out far enough to cause the rear roller 46 to engage the rivet head 54. If it is desired to completely remove the door 36 and the support 38, the door is lifted until the rear rollers 46 clear the rivets 54 and thereafter the support 38 may be completely removed along with the door 36.

The door 36 is provided with two vertical rows of hooks 78. Any one of these sets of hooks is adapted to support the front edge of a bar type shelf 80. The rear of the shelves 80 is supported by the pivoted support members 84 shown best in Figures 7 to 9. These support members are given a U-shaped double flanged configuration and are each pivoted by pins or rivets 86 to the vertical post portions 88 of an inverted U-shaped support 90. The lower ends of this support 90 are removably fastened in sockets 92 provided in the rear corner portions of the support 38. These pivoted support members 84 are located at the same height as the hook shaped supports 78 upon the rear face of the door 36. This provides a four point support for the shelves 80 at any one of several convenient heights. The pivoted supports 84 normally extend horizontally as shown in figures. They are provided with stops which engage the upward supports 88 to prevent them from pivoting below horizontally. They are recessed so that they may readily pivot to the vertical position to allow the shelves 80 to be raised by flipping upwardly the supports 84.

Figure 1:
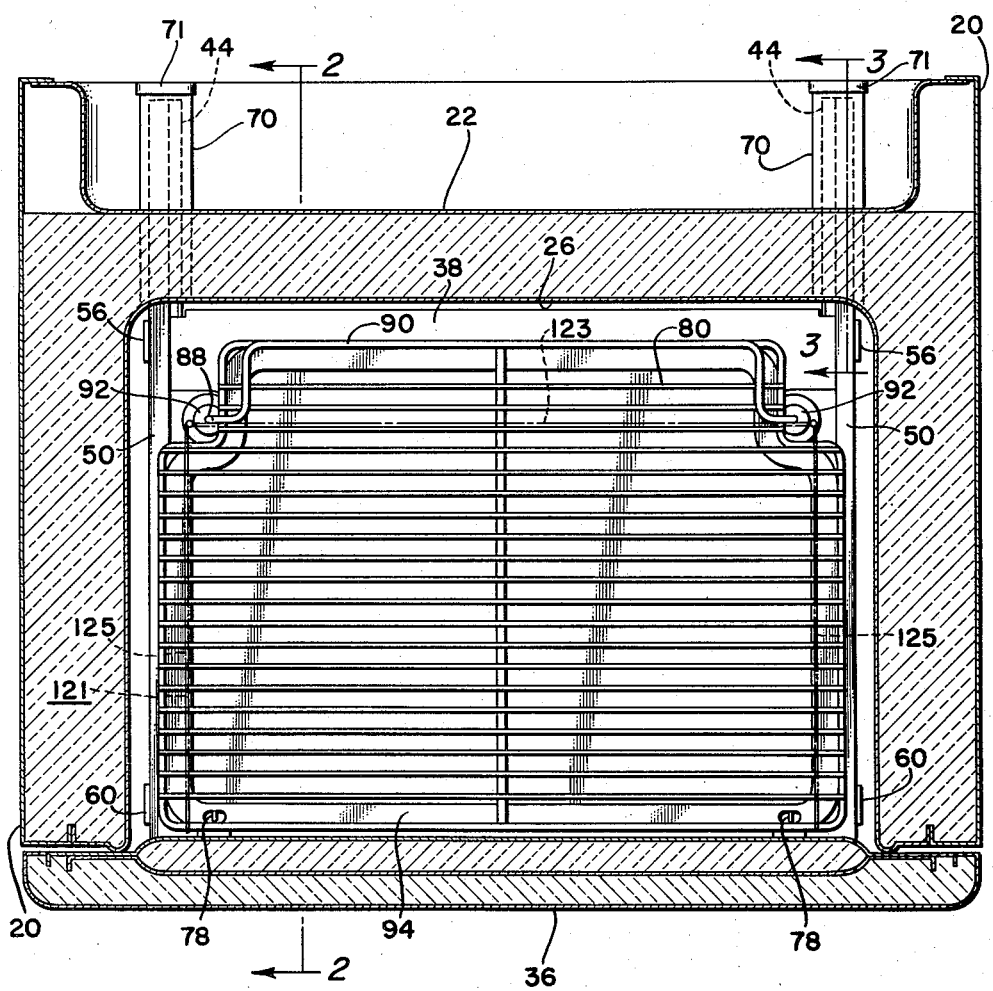
Figure 10:
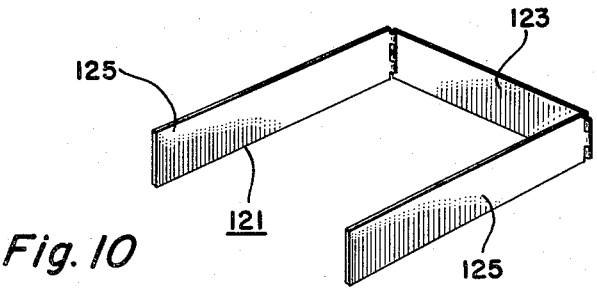
Figure 10 is a perspective view of a hinged broiling shield.

The shelf 80 is placed on the uppermost supports 78 and 84 for broiling as is shown in Figure 2. To catch the grease there is provided a pan 94 having apertures in its flange at the front to engage the hook shaped projections 78 and having flanges at the rear which are supported by the supports 84 as shown in Figure 7. By virtue of this arrangement, the meat to be broiled may be placed on the top of shelf 80 and any grease which drips from the meat will drop into the pan 94 which will remain relatively cool because of its location at the bottom of the oven so far away from the broil heaters 30. To prevent hot grease from spattering onto the walls of the oven liner 26 during broiling, there is provided a hinged collapsible metal shield 121 including a rear section 123 connected by piano type hinges to the side section 125. For protection during broiling this shield is placed upon the shelf 80 in the position indicated by the dot-dash lines in Figure 1. The upper flange at the rear of each of the rails 50 is provided with a rectangular aperture 127. A spring detent 129 is riveted to the top of the rail and has an upwardly bowed portion extending through the aperture 127 into the path of the roller 46 to resiliently hold this roller in this position whenever it is desired to hold the door 36 slightly open during broiling. Of course the baking heater 32 is not used during broiling. This shelf arrangement and door arrangement makes it possible to readily inspect the meat at any time by pulling out the door 36 until the meat upon the shelf 80 is exposed.

For roasting, the pan 94 is removed and the shelf 80 is moved down to a lower position upon the supports 78 and 84. The lower baking heater 32 is used for this operation and the heat is circulated through the apertures 40 in the support 38. The food in a suitable roasting pan may readily be placed on the shelf 80 merely by pulling out on the door 36. Thence after placing the food to be baked upon the shelf 80, the shelf 80 is returned to the inside of the oven liner 26 until the door 36 is closed. The door 36 and the shelf 80 may be pulled out together in a similar manner for inspecting the food or removing food. This reduces the necessity of reaching into the hot oven for turning meat or turning a cake which may be baking in the oven. The removability of the frame which includes the rails 50 makes it possible for everything in the oven to be readily cleaned. This construction also makes it possible to make the walls of the inner liner 26 completely smooth so that cleaning of the oven is made more easy. The complete removability of the heaters 30, 32, the door 36, its support 38 and all of the associated parts makes it possible to clean these parts readily and their removability makes easy the cleaning of the interior of the liner. In this way an improved more convenient oven is provided.

While the form of embodiment of the invention as herein disclosed constitutes a preferred form, it is to be understood that other forms might be adopted, as may come within the scope of the claim which follows:

What is claimed is as follows:

An oven including an inner liner open at the front formed of walls enclosing an oven compartment, outer walls surrounding and spaced from said liner to form an insulation space therebetween, the rear wall of said outer walls being recessed to reduce the size of said liner and oven compartment, a baking heater in the bottom of said compartment, a quickly removable frame removably mounted in said compartment including cross members and channel shaped horizontal side rails adjacent the lower sides of said compartment extending rearwardly entirely through and beyond the recessed rear wall of said liner to the rearmost extremity of said outer walls, a door for closing the opening at the front of said liner, guide means fastened to the door and extending rearwardly therefrom substantially to the rear ends of said side rails when the door is closed and having rollers at its rearward extremities cooperating with said side rails to guide said door into and out of its closing position with said inner liner, said guide means having shelf support means at various levels adjacent the rear, said door being also provided with shelf support means at said levels, a plurality of removable shelves upon said shelf support means, said recessed rear outer wall being also provided with a casing enclosing the rearmost extension of said side rails.

References Cited in the file of this patent

UNITED STATES PATENTS

| | | |
|---|---|---|
| 119,974 | Fitzhugh | Oct. 11, 1871 |
| 1,172,711 | Hunter | Feb. 22, 1916 |
| 1,206,730 | Rideout | Nov. 28, 1916 |
| 1,887,408 | Goehring | Nov. 8, 1932 |
| 1,998,517 | Moore | Apr. 23, 1935 |
| 2,028,636 | Wilkinson et al. | Jan. 21, 1936 |
| 2,133,639 | Smith et al. | Oct. 18, 1938 |
| 2,430,141 | Reeves | Nov. 4, 1947 |
| 2,456,988 | Pierson | Dec. 21, 1948 |
| 2,466,360 | Bitney | Apr. 5, 1949 |
| 2,556,365 | McKnight | June 12, 1951 |
| 2,671,004 | Chadwick et al. | Mar. 2, 1954 |
| 2,746,448 | Holmsten | May 22, 1956 |